(12) United States Patent
Morrison et al.

(10) Patent No.: US 8,215,245 B2
(45) Date of Patent: *Jul. 10, 2012

(54) VIBRATION DAMPING STAND

(75) Inventors: David Morrison, Markham (CA);
Robert G. Dickie, King City (CA)

(73) Assignee: D Morrison Consulting Inc., Markham, Ontario (CA)

( * ) Notice: Subject to any disclaimer, the term of this patent is extended or adjusted under 35 U.S.C. 154(b) by 288 days.

This patent is subject to a terminal disclaimer.

(21) Appl. No.: 12/620,174

(22) Filed: Nov. 17, 2009

(65) Prior Publication Data
US 2010/0059651 A1 Mar. 11, 2010

Related U.S. Application Data

(63) Continuation-in-part of application No. 11/811,091, filed on Jun. 8, 2007, now Pat. No. 7,640,868.

(51) Int. Cl.
*A47B 7/00* (2006.01)
(52) U.S. Cl. .............. 108/91; 108/92; 108/93; 248/562; 248/636; 211/151; 211/188
(58) Field of Classification Search .................. 248/635, 248/581, 599, 600, 602, 601, 560
See application file for complete search history.

(56) References Cited

U.S. PATENT DOCUMENTS

| | | |
|---|---|---|
| 785,571 A | 3/1905 | Raines et al. |
| 1,273,939 A | 7/1918 | Sidel |
| 2,933,850 A | 4/1960 | Martin |
| 2,947,587 A | 8/1960 | Navellier |
| 2,956,368 A | 10/1960 | Klein |
| 3,784,146 A * | 1/1974 | Matthews ..................... 248/562 |
| 4,011,821 A | 3/1977 | Neal |
| 4,493,471 A | 1/1985 | McInnis |
| 4,687,173 A | 8/1987 | Genna |
| 4,948,076 A | 8/1990 | Sumrell et al. |
| 5,169,104 A | 12/1992 | Kwoh |
| 5,570,867 A | 11/1996 | Norkus |
| 5,881,653 A | 3/1999 | Pfister |
| 5,915,662 A | 6/1999 | Itakura et al. |
| 6,024,338 A | 2/2000 | Koike et al. |
| 6,155,530 A | 12/2000 | Borgen |
| 6,247,414 B1 | 6/2001 | Sikora et al. |
| 6,296,238 B1 | 10/2001 | Lund-Andersen |
| 6,357,717 B1 | 3/2002 | Kennard, IV |
| 6,648,295 B2 * | 11/2003 | Herren et al. ................. 248/636 |
| 6,895,870 B1 | 5/2005 | Bizlewicz |
| 6,976,434 B2 | 12/2005 | Roig et al. |
| 7,640,868 B2 * | 1/2010 | Morrison et al. ............... 108/91 |
| 2006/0006307 A1 | 1/2006 | Mogilever |

* cited by examiner

*Primary Examiner* — Amy J Sterling
(74) *Attorney, Agent, or Firm* — Sand & Sebolt

(57) ABSTRACT

A stand for supporting an article a spaced distance above a support surface and for damping vibration therebetween. The stand includes a support frame having resilient bushings engaged therewith. Each bushing defines a bore into which a first end of one of a plurality of rods is received. The rods extend downwardly from the bushings and abut the support surface. The bores are configured to permit the rods to move more in one horizontal direction than in another.

20 Claims, 11 Drawing Sheets

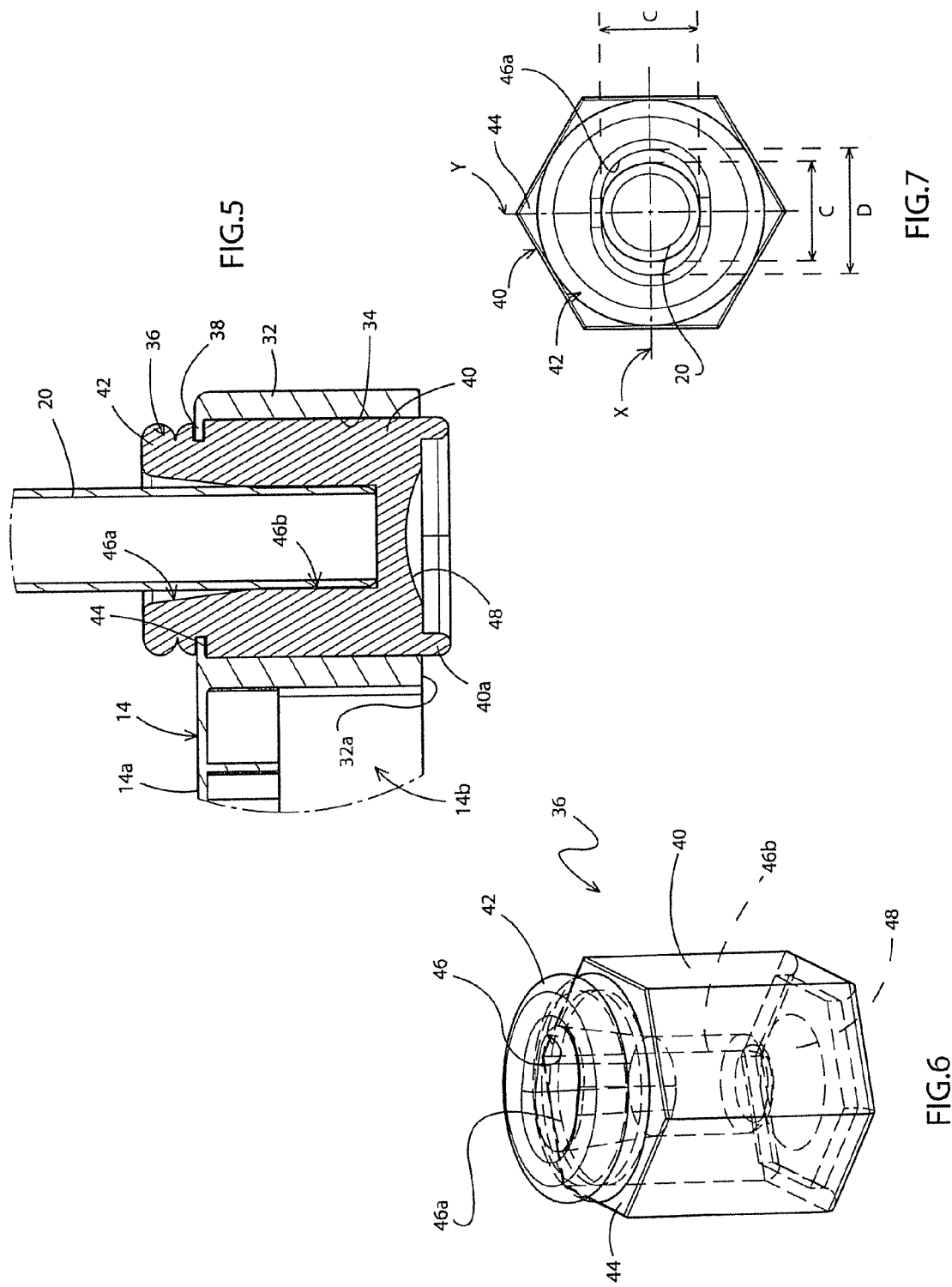

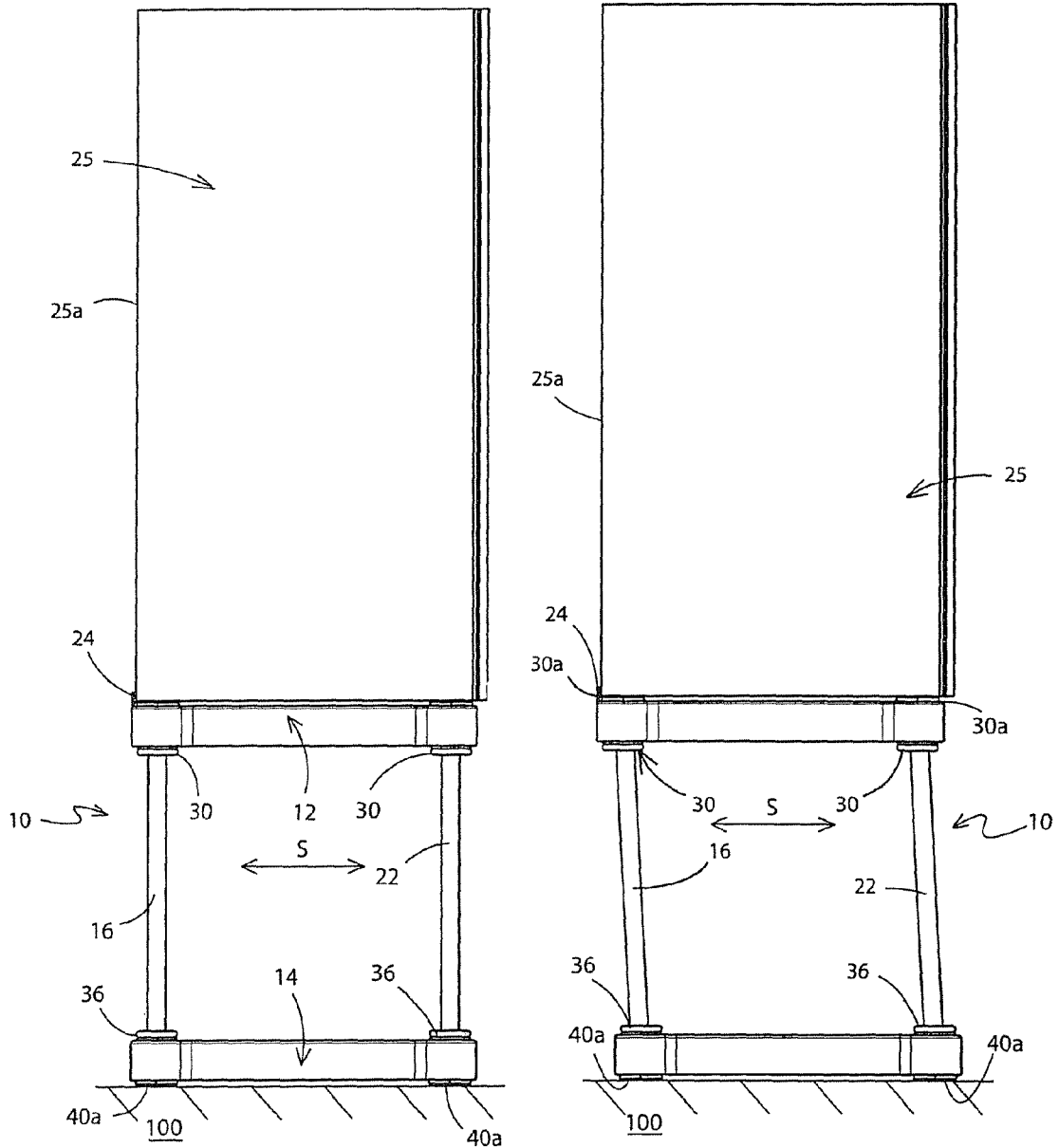

VIBRATION DAMPING STAND

CROSS-REFERENCE TO RELATED APPLICATIONS

This is a continuation-in-part of U.S. patent application Ser. No. 11/811,091, filed Jun. 8, 2007, the entire specification of which is incorporated herein by reference.

BACKGROUND OF THE INVENTION

1. Technical Field

This invention generally relates to furniture. More particularly, the invention relates to support stands for stereo equipment. Specifically, the invention relates to a support stand for large stereo speakers that includes a mechanism to enable the stand to move slightly back and forth in response to vibrations in the speaker and air movement adjacent the same and to isolate that movement from the surface upon which the stand rests, and polarize that movement to enable the speaker to move more in one direction than in another direction.

2. Background Information

When a sound system is being set up in a room, consideration has to be given to the positioning of various speakers in the system so that sound emitted therefrom is distributed evenly around the room. Further consideration has to be given to the height of each speaker relative to the floor. Sound quality is enhanced if it is essentially focused at the height of the listeners' ears. Consequently, it is desirable to raise speakers off the floor so that they direct sound outwardly at an appropriate height. Large speakers for audio and home entertainment systems frequently cannot be placed on stands or shelves as they are too heavy in that they sometimes weigh as much as 30 lbs. This means that the speakers may not be able to be positioned at an appropriate height to direct sound waves toward the listeners in a room. Even if a speaker can be placed on a stand, high-powered speakers, especially large low frequency bass speakers, move a considerable amount of air back and forth. This low frequency energy may generate considerable vibrations in the speaker and cause it to move forward and rearward across a surface. This migration places the speaker at risk if it is supported a distance above a surface. Furthermore, if the speaker cabinet is not rigidly bolted to a heavy mass or to its support, the support itself may vibrate with the speaker and possibly generate additional unwanted noise that ruins the sound quality.

There is therefore a need in the art for a speaker support that will adjust to the vibration and air movement created by the speaker, will substantially reduce migration of the vibrating speaker across the surface of the support, and is adjustable to allow sound emitted therefrom to be directed either upwardly or downwardly into a room.

SUMMARY OF THE INVENTION

The device of the present invention comprises a stand for supporting an article a spaced distance above a support surface and for damping vibration therebetween. The stand includes a support frame having resilient bushings engaged therewith. Each bushing defines a bore into which a first end of one of a plurality of rods is received. The rods extend downwardly from the bushings and the second ends thereof abut the support surface. The bores are configured to permit the rods to move more in one horizontal direction than in another. Protective members may be engaged with the second ends of the rods to protect the support surface from being damaged.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 5 is an enlargement of highlighted area B of FIG. 4;

FIG. 6 is a perspective view of a bushing used in the speaker stand of the present invention;

FIG. 7 is a top view of one of the bushings showing a supporting rod retained therein;

FIG. 9 is a side view of the speaker stand of the present invention showing a speaker cabinet retained thereon; and with the rods of the stand shown in a substantially vertical position;

FIG. 10 is a side view of the speaker stand with the speaker cabinet retained thereon, and showing the rods angled away from the vertical and the shelf shifted horizontally relative to the support in response to vibration of the speaker cabinet retained thereon and air movement adjacent to the speaker;

DETAILED DESCRIPTION OF THE INVENTION

Figure 1:
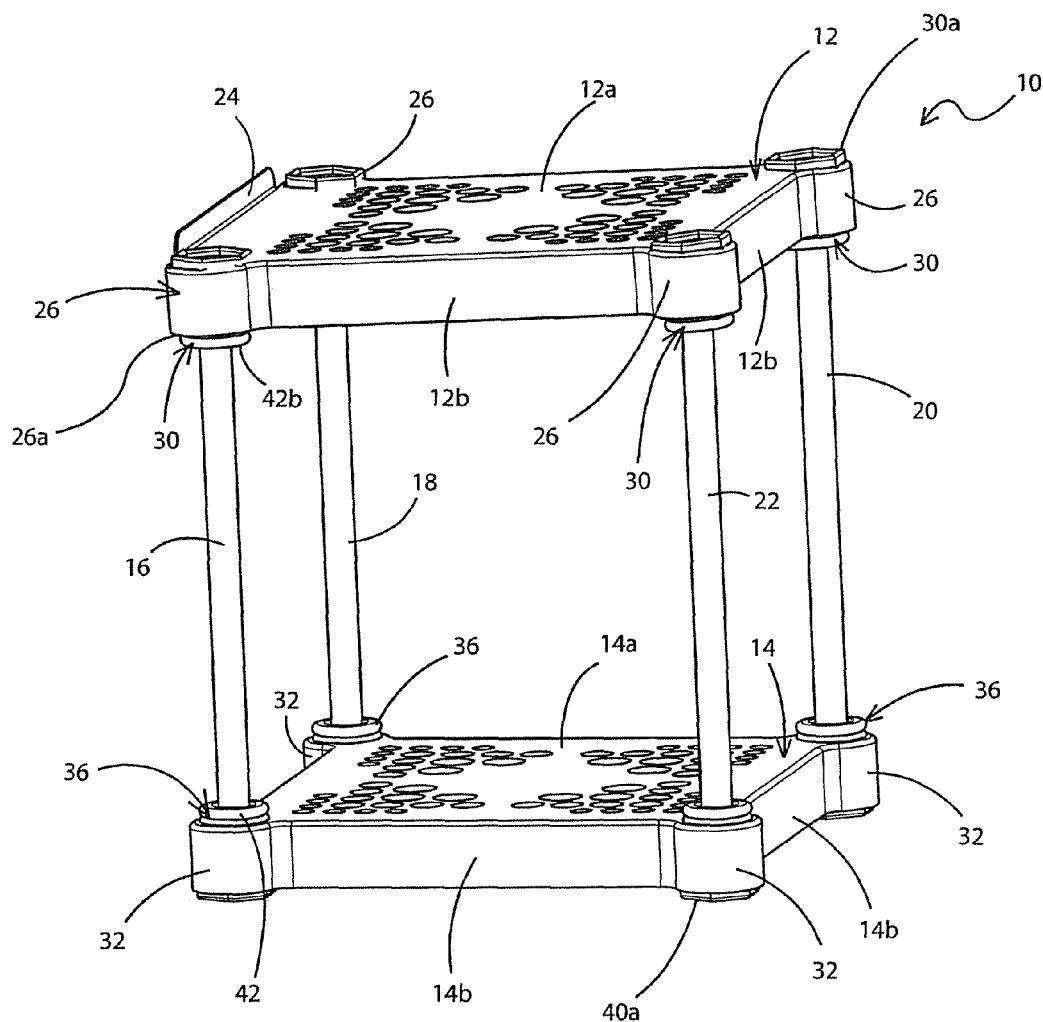
FIG. 1 is a first perspective view of a speaker stand in accordance with the present invention.
Figure 2:
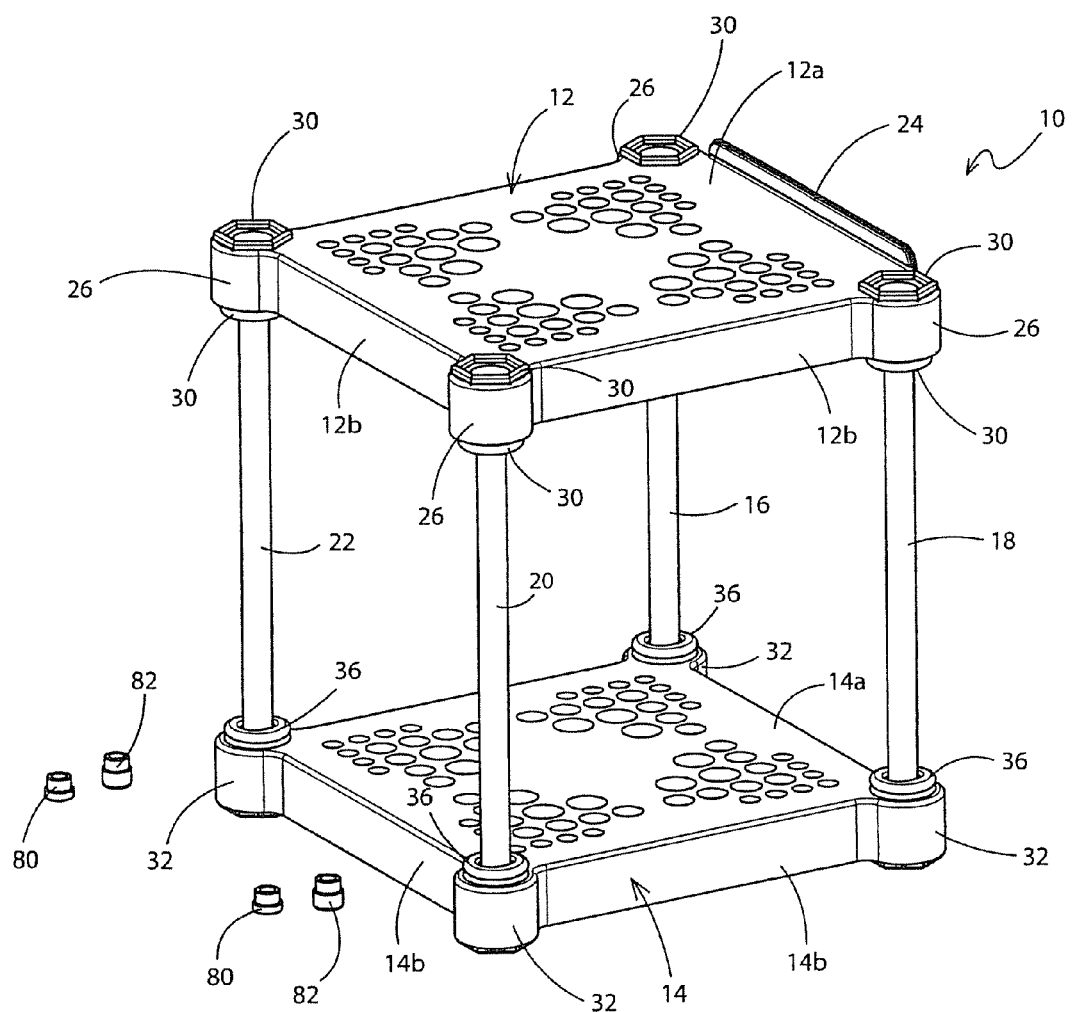
FIG. 2 is a second perspective view of the speaker stand of FIG. 1 with two sets of the adjuster plugs shown separated therefrom.

Referring to FIGS. 1-9, there is shown a speaker stand in accordance with the present invention and generally indicated at 10. Speaker stand 10 comprises a shelf 12 and support 14 positioned vertically relative to each other and maintained a distance apart by a plurality of supporting rods 16, 18, 20 and 22. Shelf 12 and support 14 preferably are made from an injection-molded ABS or styrene plastic, but may alternatively be formed from any other suitable material. Rods 16, 18, 20 and 22 preferably are thin aluminum pipes of equal length, although they may be made from any other suitable metal without departing from the spirit of the invention. Rods 16-22 are provided to support the weight of a speaker 25 (FIG. 9) that is retained on stand 10.

Shelf 12 has a top wall 12a and side walls 12b which extend downwardly away therefrom. One of side walls 12b includes an upwardly extending lip 24 that is provided with an adhesive foam layer (not shown) thereon. Lip 24 is adapted to engage one of the walls of a speaker cabinet 25 (FIG. 9), as will be hereinafter described. Lip 24 substantially prevents the speaker 25 from sliding off top wall 12a of shelf 12. Shelf 12 is molded with four projections 26 proximate the corners thereof. Projections 26 define hexagonally shaped first apertures 28 (FIG. 4) therein. An annular rim 29 extends into each first aperture 28 proximate a bottom end 26a of projection 26.

Support 14 has a top wall 14a and side walls 14b that extend downwardly away therefrom. Support 14 is molded with four projections 32 proximate its corners. Projections 32 each define hexagonally shaped second apertures 34 (FIGS. 4 and 6) therein and each projection 32 is vertically alignable with one of projections 26 on shelf 12. As shown in FIG. 5, each projection 32 includes an annular rim 38 that extends for a distance inwardly into each second aperture 34 proximate a top end of projection 32.

In accordance with a specific feature of the present invention, a plurality of isolating and polarizing assemblies 30, 36 are provided on stand 10. Preferably, a plurality of first assemblies 30 are engaged with shelf 12 and a plurality of second assemblies 36 are engaged with support 14. The assemblies are provided to permit movement of shelf 12 relative to support 14 in response to air movement adjacent speaker 25. The assemblies permit movement of speaker 25 but isolate that movement from surface 100. The assemblies further polarize the movement of speaker 25 relative to support 14 so that movement is permitted more in one direction than in another direction.

In accordance with a specific feature of the present invention, the first and second assemblies are resilient bushings 30, 36 that are snap fitted into the respective one of first and second apertures 28, 34 and retain rods 16-22 therebetween. Bushings 36 will be described hereinafter with reference to FIGS. 3-7, but it should be understood that bushings 30 are substantially identical to bushings 36 and are used in the same manner and for the same purpose. Each bushing 36 is an integrally formed, injection molded, rubber component. Bushing 36 has a hexagonally-shaped body 40 and a double annular flange 42 that extend vertically outwardly away from body 40. A shoulder 44 is formed at the transition between body 40 and flange 42. Body 40 is complementary in shape and size to second aperture 34 in projection 32 of support 14. Bushing 36 is snap-fitted into second aperture 34 and can only be received therein when the complementary hexagonal shapes of bushing 36 and second aperture 34 are aligned. A shallow depression 48 is provided in the end of body 40 opposite to flange 42. Depression 48 allows body 40 to flex slightly as bushing 36 is engaged in second aperture 34. When bushing 36 is snap-fitted into second aperture 34, the flange 42 thereof is inserted first into second aperture 34 and bushing is pushed upwardly until shoulder 44 engages rim 38. At this point, flange 42 extends upwardly beyond top wall 14a of support 14 and an end portion 40a of body 40 (FIG. 5) extends outwardly below bottom end 32a of projection 32. End portion 40a is adapted to abut the surface 100 upon which stand 10 rests and stand 10 therefore effectively is supported on end portions 40a of bushings 36.

Bushings 30, on the other hand, are inserted into shelf 12 in exactly the opposite orientation. The shoulder (not numbered) of bushing 30 engages rim 29 of projection 26. Flange portion 42b thereof extends downwardly beyond bottom end 26a (FIG. 1) of projection 26 and end portion 30a of bushing 30 extends upwardly away from top wall 12a of shelf 12. Consequently, a larger speaker 25 may not rest directly on shelf 12 but may instead rest on end portions 30a of bushings 30.

In accordance with another specific feature of the present invention, each bushing 36 is provided with a longitudinal bore 46 that extends from flange 42 into the interior of body 40. Bore 46 does not extend entirely through body 40 and terminates a distance inwardly from depression 48. A first section 46a of bore 46 is substantially oval in cross-sectional shape (FIGS. 6 and 7). A second section 46b of bore 46 extends inwardly from this oval-shaped first section 46a and is generally cylindrical in cross-sectional shape. Bore 46 is provided to receive and retain an end of one of rods 16, 18, 20 and 22 therein. Second section 46b is configured so as to be complementary to the end of one of the rods, such as rod 20. Consequently, the end of rod 20 is tightly retained in second section 46b. First section 46a of bore 46 is not complementary to the external shape of rod 20. As shown in FIG. 7, first section 46a of bore 46 has a width "C" that is substantially equal to the diameter of rod 20. First section 46a has a length "D" that is substantially longer than the diameter "C" of rod 20. Thus, rod 20 is able to move to a limited degree back and forth in a direction parallel to the "Y" axis of bushing 36, but can move considerably more from side to side in a direction parallel to the "X" axis of bushing 36.

The above characteristic features of bushings 30 and 36 provide a mechanism to permit some forward and rearward movement of a portion of stand 10 in response to vibrations in speaker 25 as well as the movement of is air adjacent speaker 25, while isolating that movement from surface 100. Specifically, bushings 30, 36 enable shelf 12 to move forward and backward relative to support 14 as air moves adjacent speaker 25. This movement is both in response to and in unison with the air movement. Bushings 30, 36, however, polarize this movement so that shelf 12 can move backward and forward but is limited in moving side-to-side. This creates a more stable base for speaker 25. The polarizing ability is enabled because body 40 of bushing 36 is hexagonal in shape and can therefore only engage in second aperture 34 in one of several specific orientations. The actual orientation of bushing 36 can be preselected to permit rods 16-22 and therefore shelf 12, to move more in a first particular direction than in a second direction. The orientation of the length and width of first sections 46a of bushings 36 is specifically selected to allow movement in the first direction and limit movement in the second direction.

Figure 8B:
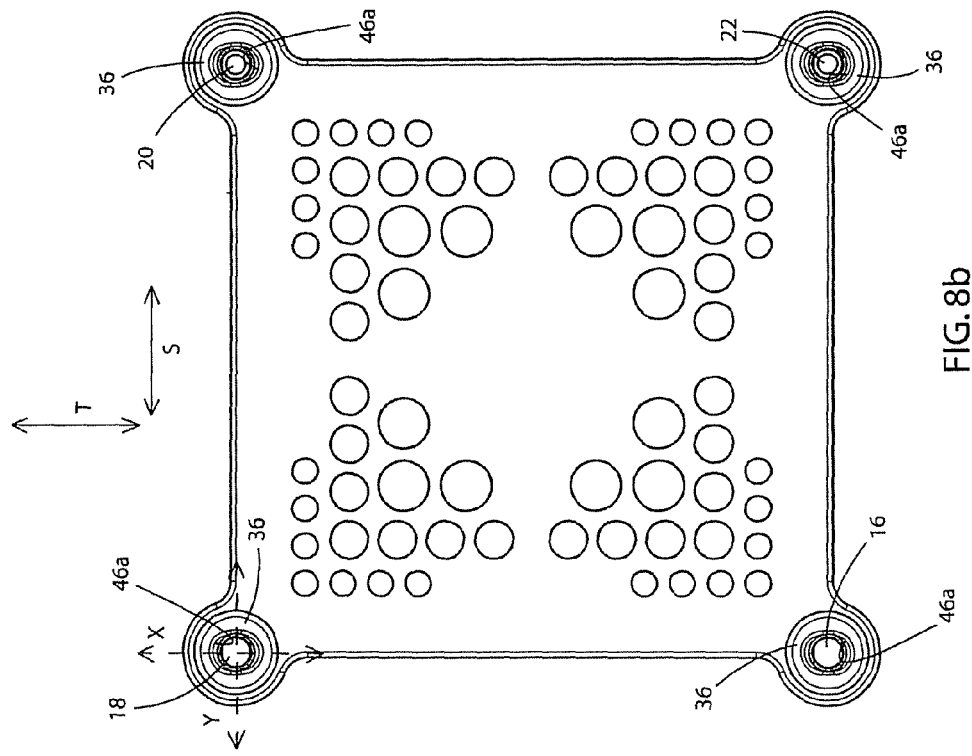
FIG. 8B is a top view of the support taken through line E-E of FIG. 4 and showing a second possible orientation of the bushings therein.
Figure 8A:
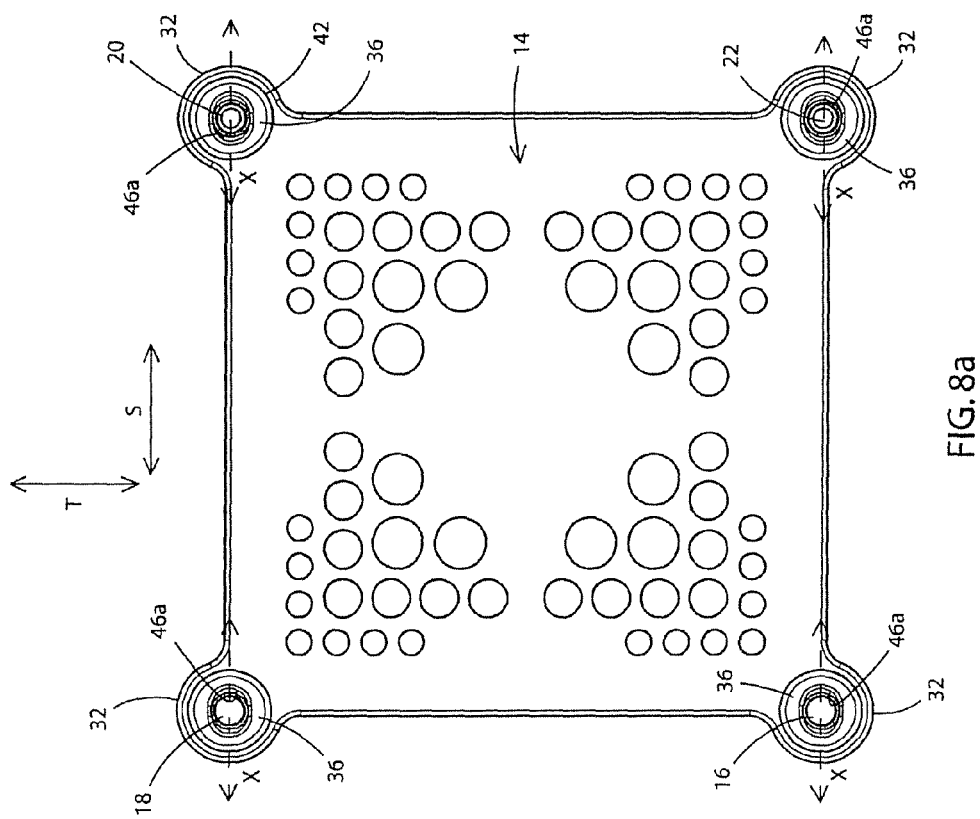
FIG. 8A is a top view of the support taken through line E-E of FIG. 4 and showing a first possible orientation of the bushings therein.
Figure 11:
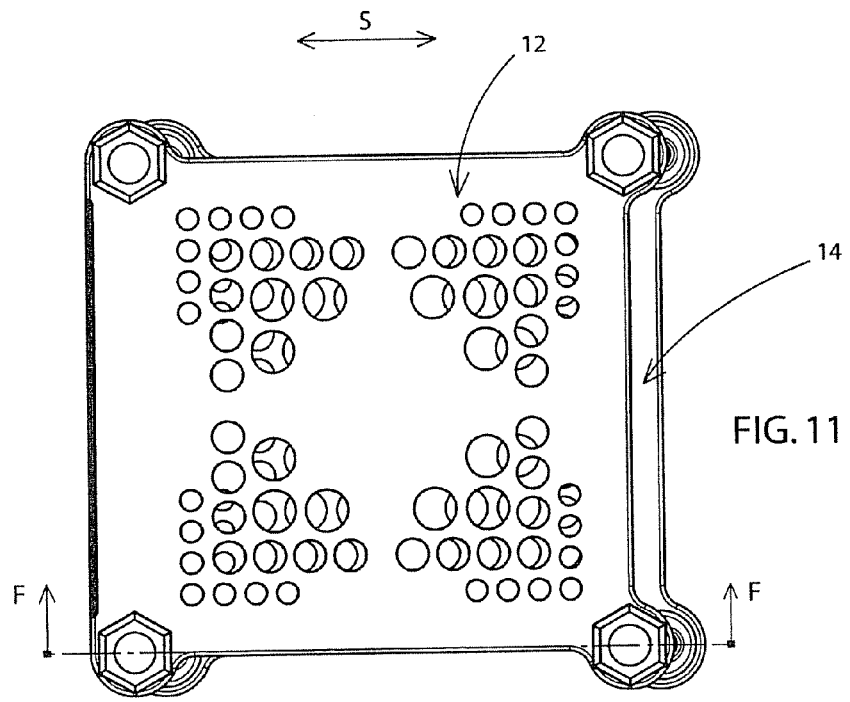
FIG. 11 is a top view of the speaker stand of FIG. 10 with the speaker cabinet removed therefrom to shown the misalignment of the shelf and the support.
Figure 12:
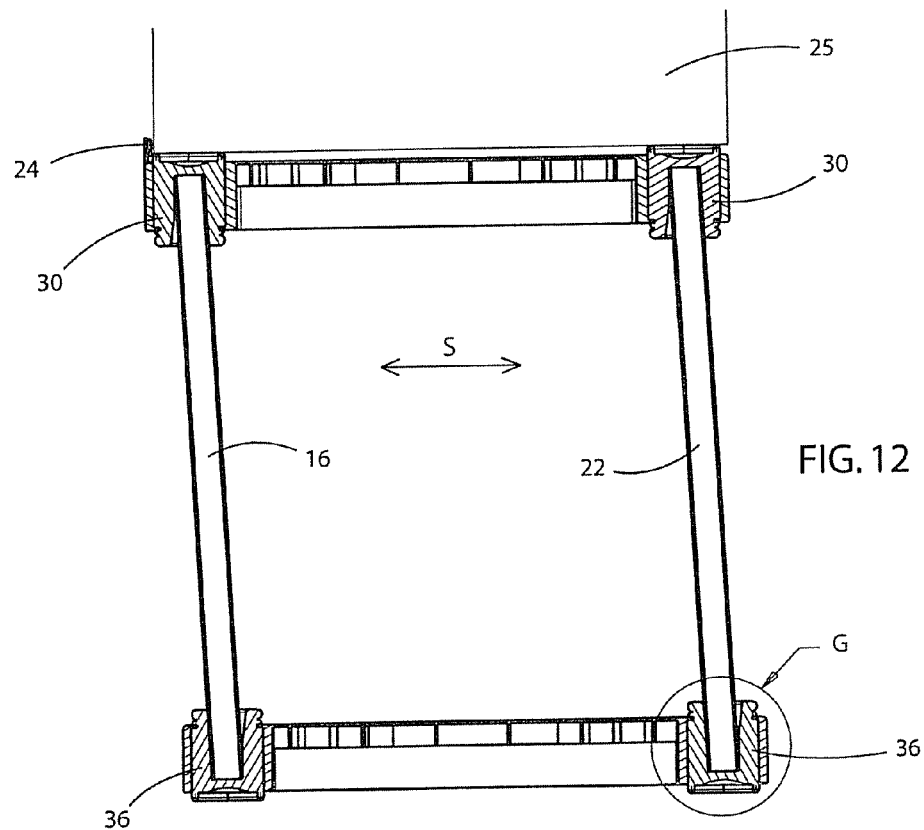
FIG. 12 is a cross-sectional side view of the speaker stand taken through line F-F of FIG. 11.

This is illustrated in FIGS. 8A and 8B. In these figures, air moves adjacent the speaker 25 in the direction indicated by arrow "S". In FIG. 8A, each bushing 36 has been oriented within second aperture 34 so that the length of first sections 46a thereof is aligned with the direction "S" and the width thereof is aligned with the direction "T". The length of each first section 46a is greater than the diameter of the associated rod 16-22 retained therein. The size difference permits some movement of rods 16-22 within bores 46 in a direction substantially parallel to direction "S". Furthermore, the flaring shape of first sections 46a and the tight retention of the ends of rods within second sections 46b of bores 46, causes the back and forth movement of rods 16-22 to also have an arcuate component. This allows shelf 12 to move back and forth in the direction "S" relative to support 14. Support 14 remains in a fixed position on surface 100. Furthermore, the predominant direction of movement of shelf 12 is the same direction as air moving inwardly and outwardly relative to speaker 25. Additionally, the width of first sections 46a of bushings 36 is substantially equal to the diameter of the rods 16-22. Consequently, movement of rods 16-22 in a side-toside motion in the direction of arrow "T" is considerably reduced. Bushings 36 thereby essentially dampen motion in a direction "T" while allowing motion in the direction "S".

FIG. 8B, illustrates a situation where bushings 36 are oriented so that the lengths of first sections 46a of bores 46 are oriented with their "X" axes aligned with direction "T", and the widths thereof are aligned with direction "S". This orientation of bushings 36 would permit shelf 12 to rock side-to-side relative to support 14, if air movement was aligned with direction "T" and would limit back and forth movement in response to air movement relative to speaker 25. If air movement is aligned with direction "S", stand 10 might be unstable.

Referring to FIGS. 9-14, stand 10 is used in the following manner to support a speaker 25. Speaker 25 is shown supported on stand 10 and preferably resting on end portions 30a of bushings 30. It will be understood that speaker 25 may rest entirely on end portions 30a, or at least partially on end portions 30a and shelf 12, or entirely on shelf 12. Stand 10, itself, is illustrated as supported on surface 100 by resting on end portions 40a of bushings 36. Lip 24 of stand 10 is shown abutting a front wall 25a of speaker 25 so that when speaker 25 moves forward and rearward in response to the air movement adjacent speaker 25, the speaker does not drop forwardly off stand 10 and the vibrations and movement are not transmitted to surface 100.

Figure 13:
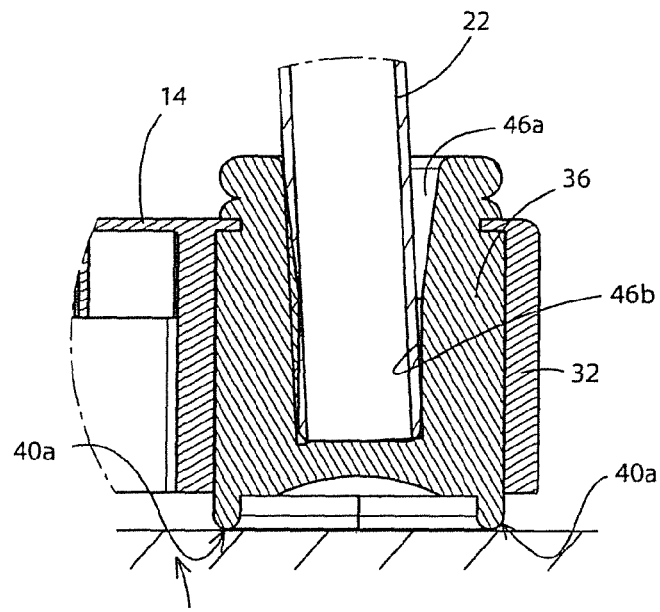
FIG. 13 is an enlargement of highlighted area G of FIG. 12.
Figure 14:
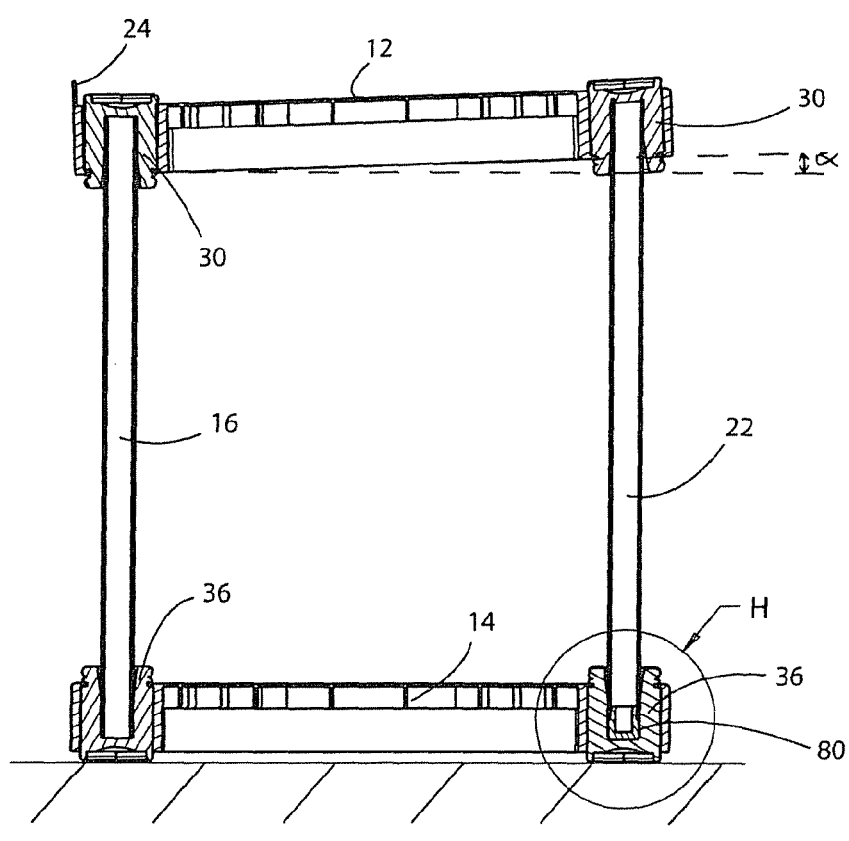
FIG. 14 is a cross-sectional side view of the speaker stand with the adjuster plugs inserted into the one of the sets of bushings so as to incline one side of the shelf upwardly relative to the support.
Figure 15:
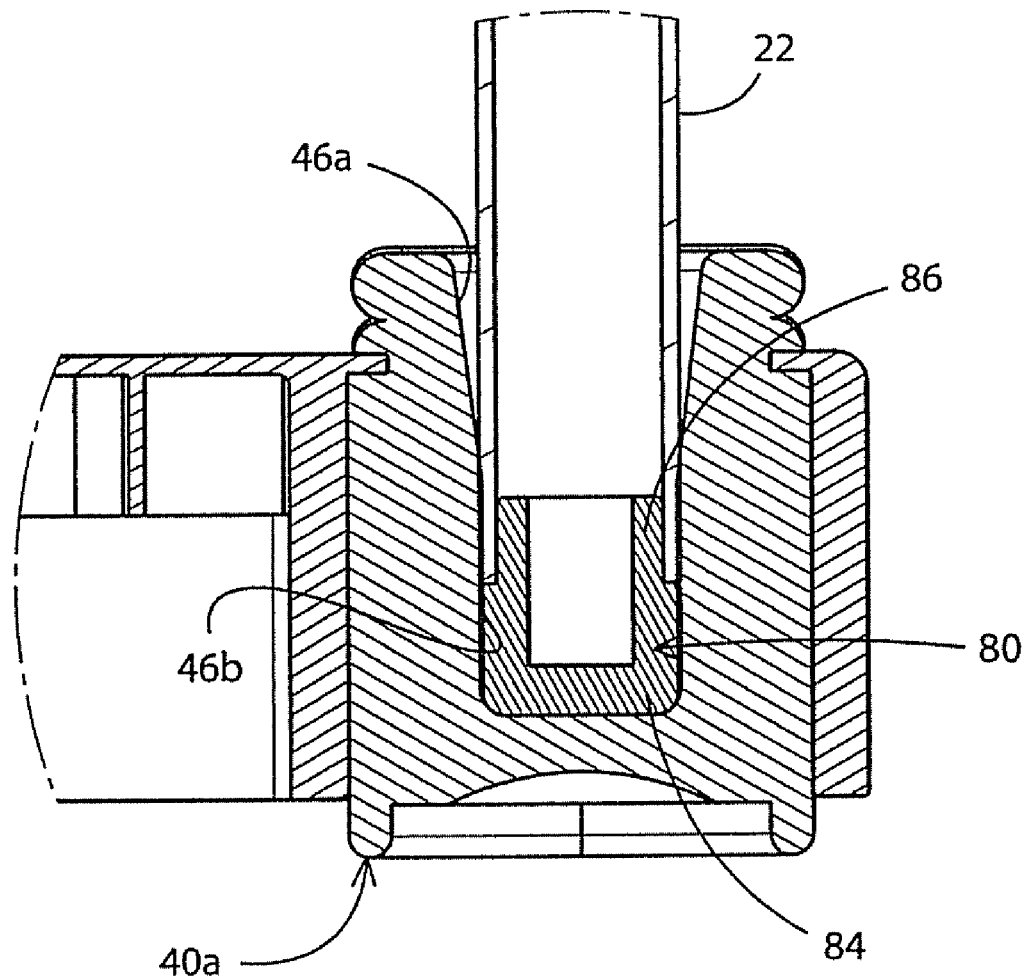
FIG. 15 is an enlargement of highlighted area H of FIG. 14.

FIGS. 9-13 show the position of the relevant components of stand 10 when the speaker is emitting sound through front wall 25a. As speaker 25 vibrates and air is forced outwardly away from front wall 25a in the direction of arrow "S" (FIG. 9), an equal and opposite reactionary force is brought to bear on shelf 12. Because of the orientation of bushings 30, 36 and the difference in dimension between rods 16-22 and first section 46a of bores 46, shelf 12 is able to moves rearwardly in the opposite direction to arrow "S" in response to this reactionary force. Thus, shelf 12 moves from the position shown in FIG. 9 to the position shown in FIGS. 10-12. When the vibratory and air movement is reversed and is in the opposite direction to "S", shelf 12 is caused to move in the direction of arrow "S" and returns to its original position (FIG. 9) or even beyond that position (not shown). The vibrations of speaker 25 and air movement relative thereto, switches again to the direction of arrow "S" causing shelf 12 to move back to the position shown in FIG. 10. Shelf 12 therefore slides back and forth in response to the speaker vibrations and air movement relative to speaker 25. Shelf 12 remains horizontally positioned relative to support 14 during all of this movement and the rods 16-22 angle slightly rearwardly and then slightly forwardly to enable this movement. This occurs because rods 16-22 are able to move slightly within the first sections 46a of bushings 30, 36 (FIGS. 13 and 14). As shown in FIG. 14, when rod 22 moves, end portion 40a of bushing 36 remains firmly in contact with surface 100 and rod 20 moves off vertical within bore 46. Shelf 12 and support 14 stay substantially parallel to surface 100 even though there is a vertical shift in rods 16-22 (FIG. 10). As discussed above, very little side-to-side motion in the direction of arrow "T" (FIG. 8A) can occur, so shelf 12 and support 14 are horizontally stable, just moving a small distance back and forth to essentially absorb the vibrations from speaker 25. Furthermore, because speaker 25 is resting directly on bushings 30 and does not physically contact shelf 12, no vibrations are transmitted directly to the shelf 12 and therefore no unwanted noise is generated by setting up a vibration in shelf 12. As the speaker 25 vibrates and moves air relative thereto, speaker 25 can effectively float back and forth (arrow "S"—FIG. 8A) on shelf 12 while remaining relatively stable in the side to side direction (arrow "T"—FIG. 8A). If the speaker 25 was allowed to move in both the forward-and-back and side-to-side directions, the speaker 25 would likely be unstable on the stand 10 and would perhaps move in a circle with oscillations. The stand 10 would then not provide adequate security for supporting a heavy speaker 25.

It will be understood that if it is preferably for stand 10 to move slightly from side to side in the direction of arrow "T" (FIG. 8B), then bushings 30, 36 will be oriented in the manner shown in FIG. 8B. Stand 12 will then be caused to sway slightly from side to side because rods 16-22 will move from side to side in the differently oriented bushings 30, 36. Furthermore, stand 10 may be rotated in any needed direction to position lip 24 at an appropriate spot to substantially prevent speaker 25 from being vibrated off the same.

Figure 3:
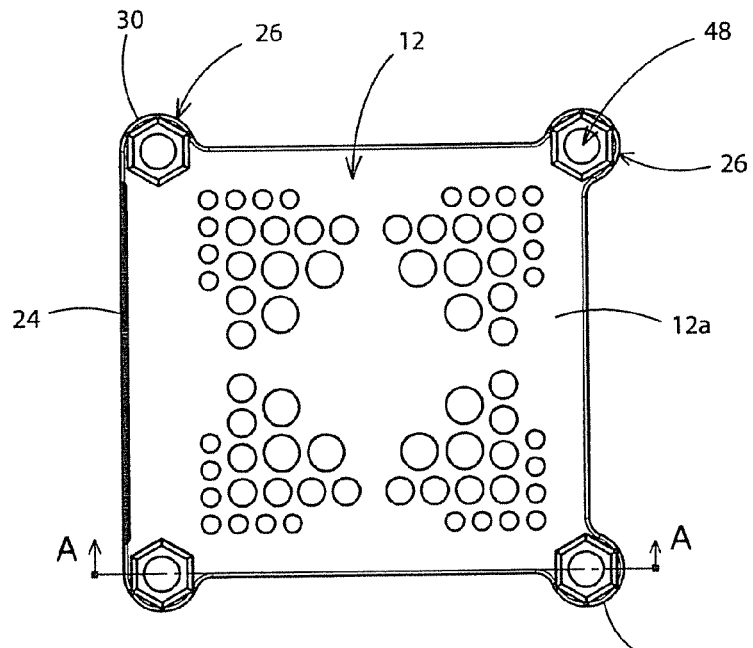
FIG. 3 is a top view of the speaker stand of FIG. 1.
Figure 4:
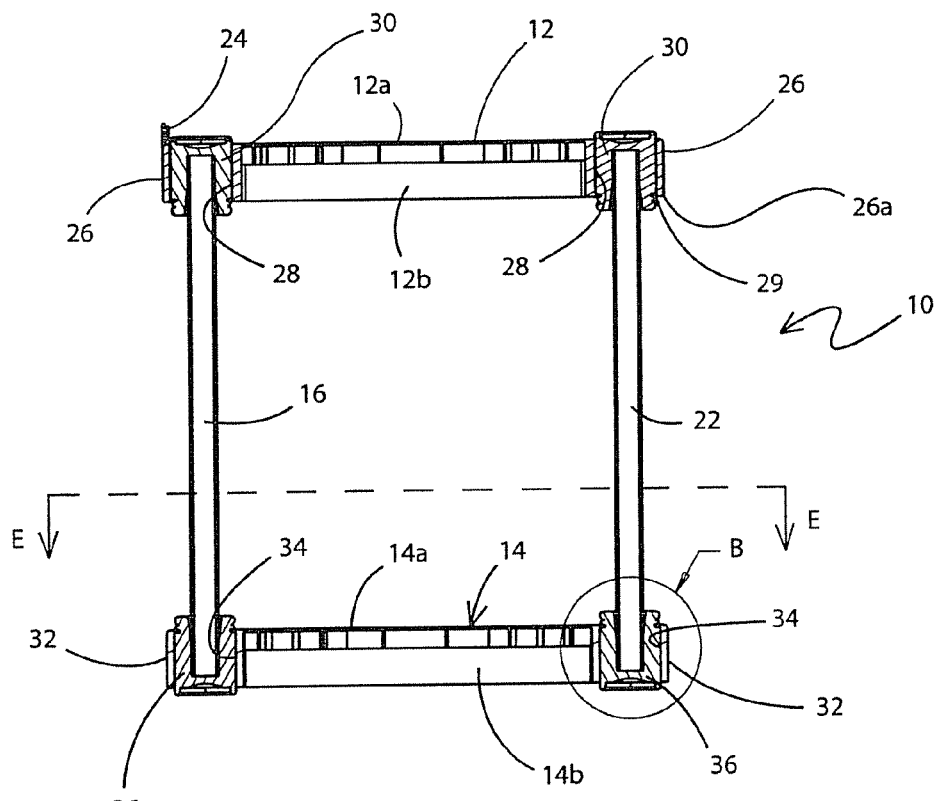
FIG. 4 is a cross-sectional side view of the speaker stand taken through line A-A of FIG. 3.
Figure 16:
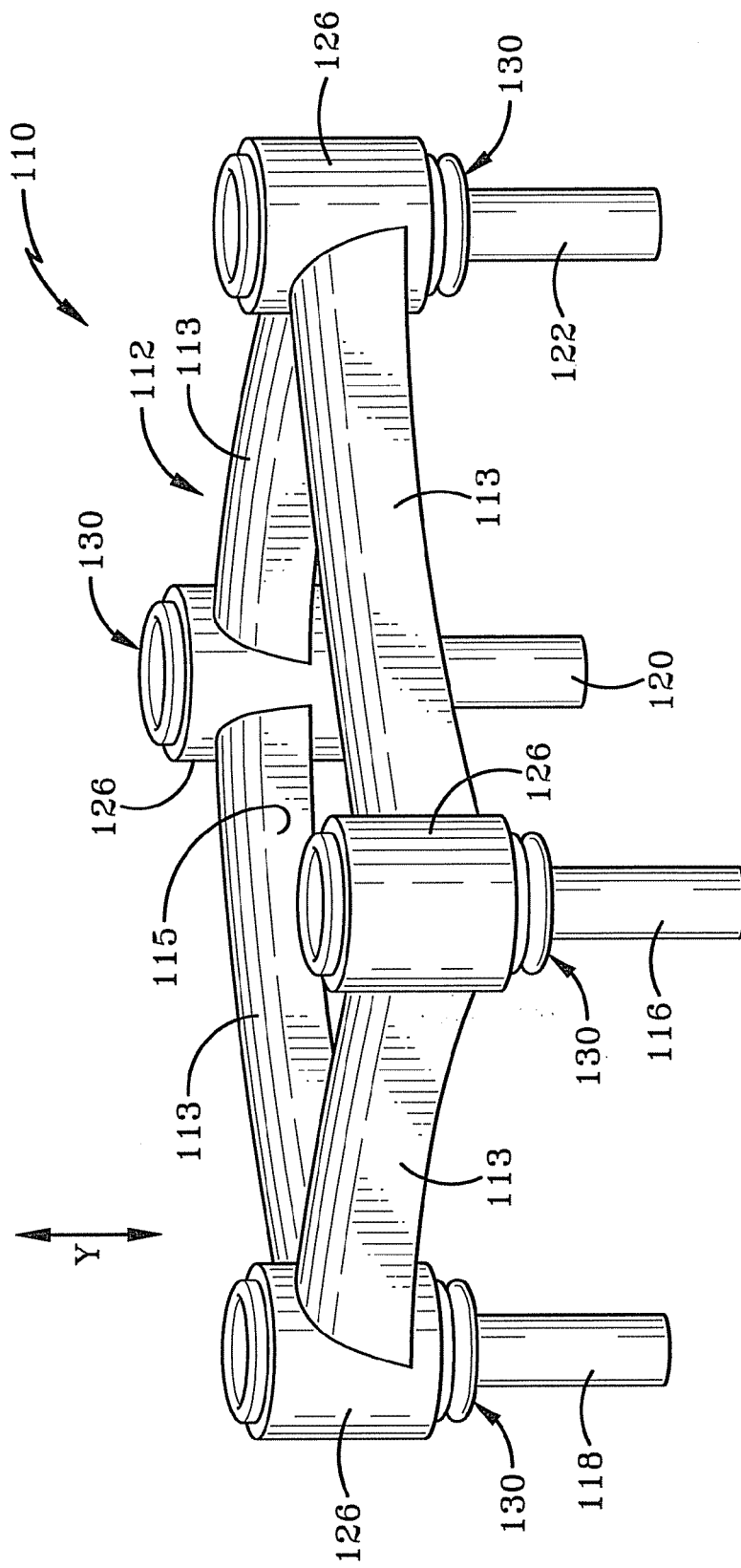
FIG. 16 is a perspective view of a second embodiment of a speaker stand in accordance with the present invention.

In some instances, it is desirable to be able to direct sound emitted from the speaker 25 either upwardly or downwardly relative thereto. For instance, if a living room is sunken relative to an area upon which a speaker is to be placed, it might be desirable to angle speaker 25 in such a way that it directs the sound downwardly. This may be done by inclining the shelf 12 relative to the support 14. In order to do this, there are provided one or two sets of adjuster plugs 80, 82 (FIG. 3). Adjuster plugs 80, 82 are made from a suitable plastic material and are of different relative heights. Both size plugs 80, 82 are designed to be received within bore 46 of bushings 36 in the manner shown in FIG. 16. FIG. 16 shows that adjuster plugs 80 (and 82) comprise an annular base 84 that is substantially of the same diameter as second section 46b of bore 46 and the same diameter as rod 22. The upper end 86 of plug 80 is of a narrower diameter than base 84, the difference in the diameter being that of the thickness of the rod 22 to be received around the same. Essentially, a small portion of the end of rod 22 slides over upper end 86 of plug 80 and becomes wedged between upper end 86 and that portion of bushing 36 that defines second section 46b of bore 46. Plug 80 raises one end of shelf 12 away from support 14 by an angle α. Although not shown, plug 82 is longer than plug 80 and, consequently, would raise one end of shelf 12 away from support 14 by an angle greater than α. A speaker resting on shelf 12 will therefore be tilted slightly upwardly (by an angle α) and will therefore direct sound emitted therefrom slightly upwardly.

In a similar fashion, if it is desirable to cause sound to be directed downwardly, plugs 80 or 82 may be inserted in bores 46 of the bushings 36 that receive rods 16 and 18 instead of rods 20 and 22. This will cause the opposite end of shelf 12 to be lifted and, consequently, a speaker resting on shelf 12 will be adjusted to cause the sound emitted therefrom to be directed downwardly toward surface 100. Whether shelf 12 is tilted upwardly at the front or downwardly at the back, support 14 remains firmly seated on the surface 100 and remains horizontally disposed relative thereto. In both these instances, lip 24 plays an important roll keeping speaker 25 on shelf 12. Furthermore, because of the presence of the oval shaped first section 46a of bores 46 in bushings 30, 36, vibrations can be polarized and dampened in stand 10 even when plugs 80 or 82 are utilized therein.

It will be understood that it is possible that one of each of the adjuster plugs 80, 82 could be received within a single bore 46 of bushings 30, 36 if the tilt angle required a more extensive height adjustment.

Whenever stand 10 retains speaker 25 therein, the bushings 30, 36, and especially the flanges 42 and curved end portions 30a and 40a aid in dampening the vertical vibrations emitted from speaker 25 because they flex.

Figure 17:
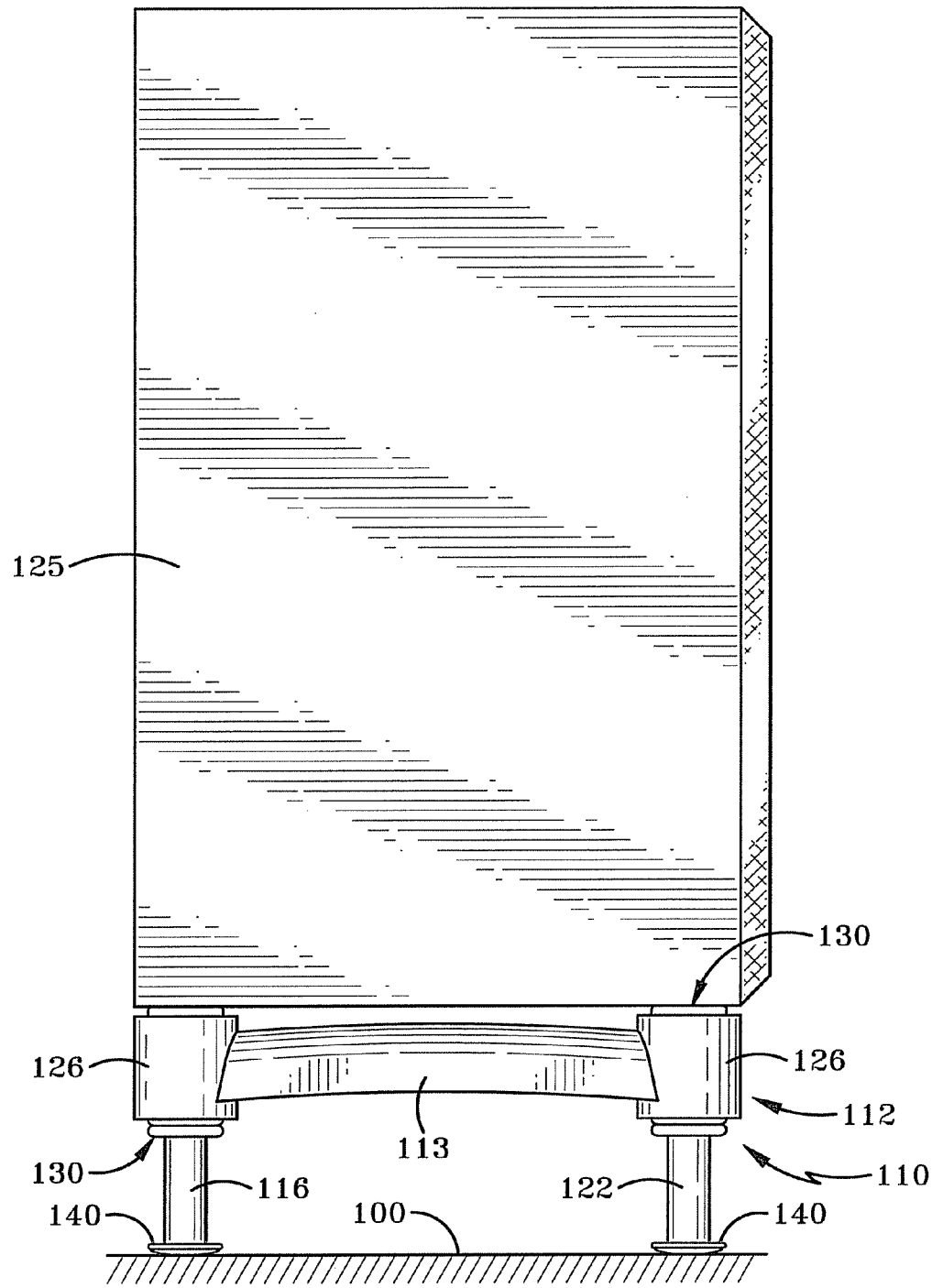
FIG. 17 is a side elevation of the speaker stand of FIG. 16 shown supporting a speaker thereon.

Referring to FIGS. 16 and 17, there is shown a second embodiment of a speaker stand in accordance with the present invention and generally indicated at 110. Stand 110 comprises a support frame 112 having four frame members 113. Each frame member 113 is an elongate, tubular member. Frame members 113 are coplanar with each other and are connected end-to-end in such a manner that they surround and define a space 115 between them. In accordance with a specific feature of the present invention, a projection 126 is interposed between the ends of adjacent pairs of frame members 113. As shown in FIG. 16, the exterior surface of projections 126 is arcuate or rounded in shape. A portion of each projection 126 extends upwardly for a distance beyond an upper surface of each frame member 113. Furthermore, a portion of each projection 126 extends downwardly for a distance beyond a lower surface of each frame member 113.

Support frame 112 is generally rectangular in shape and the projections 126 are disposed at the four corners of the rectangle. Preferably, support frame 112 is a unitary member, meaning that the frame members 113 and projections 126 are molded as a unit instead of being separately manufactured and then secured together. Support frame 112 preferably is molded from a rigid plastic. It will be understood, however, that the support frame 112 may be manufactured from any suitable material using any suitable process. Furthermore, support frame 112 may be differently shaped and be comprised of only three frame members 113 and three projections 126, or it may be comprised of more than four frame members 113 and more than four projections 126. The configuration of support frame 112 illustrated in FIG. 16 is therefore by way of example only.

Each projection 126 is substantially identical to the projections 26, 32 provided on speaker stand 10. Furthermore, projections 126 each house an isolating assembly in the form of a resilient bushing 130 that is substantially identical to the resilient bushings 30, 36 provided on speaker stand 10. Projections 126 and resilient bushings 130 are substantially identical in shape and function to the projection 32 and resilient bushing 36 illustrated in FIGS. 5-7. Consequently, the numbering used to explain the functioning of this second embodiment of stand 110 will refer partly back to the numbering and description related to the projection 32 and bushing 32 shown in FIGS. 5-7 and partially to the description relating to the projection 26 and bushing 30. The apertures 34 (FIGS. 5-7) in the projections 126 are longitudinally oriented and are aligned with the longitudinal axis "Y" shown in FIG. 16. Consequently, is bushings 130 are longitudinally, aligned with the axis "Y" as are the bores (46a, 46b—FIGS. 5-7) defined therein.

Each bushing 130 is provided with a flange 142b that extends downwardly below a lowermost surface of the projection 126 and an end portion 130a that extends upwardly from an upper surface the projection 126. The bore (46a, 46b—FIGS. 5-7) is accessible in a lowermost surface of flange 142b and extends vertically upwardly therefrom. The end portions 130a of each bushing 130 include a depression 148 therein. The bore terminates a distance inwardly from depression 148.

In accordance with a specific feature of the present invention, support frame 110 includes four rods 116, 118, 120, 122. An end of each one of these rods is received in the one of the bores (46a, 46b—FIGS. 5-7) of one of the bushings 130. Rods 116-122 extend outwardly and downwardly away from the lowermost surface of the flanges 142b and into abutting contact with a surface 100 upon which the stand rests. In accordance with yet another specific feature of the present invention, rods 116-122 are substantially shorter than the rods 16-22 and may be only around one half inch to two inches in length. Preferably, rods 116-122 are around one inch in length. The free ends of the rods 116-122, i.e., those ends not received in bushings 130, directly contact surface 100 and retain frame members 113 a spaced distance above surface 100.

Some type of protective member 140 may be provided at or on the free end of each rod 116-122 to reduce the possibility of those free ends scratching surface 100 or making indentations therein because of the weight of an article, such as a stereo speaker 125, supported on frame 112. FIG. 17 shows one type of protective member 140 that may be utilized in the form of a friction reducing pad positioned between surface 100 and the free ends of the legs 116 and 122. (Obviously, identical pads 140 would be provided on legs 118, 120.) Other types of projective member 140 could be utilized instead of the friction reducing pads. These include rubber caps, flexible feet, friction-increasing pads, friction-reducing pads, and spikes, to name but a few. Protective members 140 may be secured to rods 116-122 by an adhesive or other fastener or may simply be interposed between the free ends of the rods and the surface 100 and not be physically connected to either of them.

As illustrated in FIG. 16 and in accordance with yet another feature of the present invention, frame members 113 define a space 115 therein between. Space 115 is provided so as to encourage the user to place the article to be supported on stand 110 directly onto the end portions 130a of bushings 130. So, for example, if the article to be supported is a stereo speaker 125, as shown in FIG. 17, a lower end of the speaker 125 is placed directly on the second ends of the bushings 130. This ensures that vibrations from speaker 125 are damped most effectively. If a shelf region were provided between frame members 113 in the region occupied by space 115, the user might inadvertently or intentionally place speaker 125 onto that shelf region instead of onto the end portions 130a of bushings 130. This would tend to reduce the effectiveness of the vibration damping.

It will be understood that one or more of adjuster plugs (80, 82), which were discussed with reference to the first embodiment of the invention, may be placed into the bores of one or more of the bushings 130. These adjuster plugs will keep the first end of rods 116-122 spaced a distance away from the second end of the bore. This effectively increases the length of the rod 116-122 that projects outwardly away from the bore and thus increases the space between the lower surface of the support frame 112 and the support surface 100. The adjuster plugs may be placed into the bores of only two of the bushings 130, for instance those bushings receiving rods 116, 122 therein. This would then effectively increase the length of rods 116, 122 extending outwardly from the lower surface of one side of support frame 112 and therefore create an angled upper surface on support frame 112. The stereo speaker 125 would therefore be retained on stand 110 at an angle to the horizontal.

As indicated above, the bores in the resilient bushings are configured to permit the rods to move more in one horizontal direction than in another. This configuration aids in keeping the vibrations and oscillations of a speaker supported on the stand moving in the same plane as the speaker's audio transducer. Additionally, the elongation of the bore provides more space in the bushing for the user to insert adjuster plugs between the second end of the bore and the first end of the rod. The user can therefore more easily change the tilt of the speaker supported on the stand so that sound is emitted into a room at an optimum angle. Both of these features tend to improve the quality of the sound emitted by a speaker supported on the stand of the present invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A stand for supporting an article vertically above a support surface, said stand comprising:
   a support frame;
   a plurality of isolating assemblies provided on the support frame, each isolating assembly comprising:
      a resilient bushing having a first end and a second end, and having a longitudinal axis extending therebetween;
      a longitudinal bore defined in the bushing, said bore having a first end adjacent the first end of the bushing and a second end disposed a distance inwardly from the second end of the bushing; wherein the first end of the bore is elliptical in shape in a first horizontal plane disposed at right angles to the longitudinal axis; and the second end of the bore is circular in shape in a second horizontal plane disposed at right angles to the longitudinal axis and
   a plurality of rods, each rod having a first end that is received within the bore of one of the resilient bushings and a second end which extends outwardly from the bore and is adapted to contact the support surface, and wherein the rod is circular in cross-sectional shape and is complementary in diameter to the second end of the bore such that an exterior circumferential surface of the rod abuts an interior surface of the bushing which defines the second end of the bore; and a gap is defined between the exterior surface of the rod and a portion of the interior surface of the bushing which defines the first end of the bore.

2. A stand for supporting an article vertically above a support surface, said stand comprising:
   a support frame comprising:
      three or more frame members which are coplanar and are disposed in end-to-end relation to each other;
      three or more projections, wherein each projection is interposed between and connected to the ends of two adjacent frame members; and
      wherein the frame members and projections surround and define a central space between them;
   a plurality of isolating assemblies provided on the support frame, each isolating assembly comprising:
      a resilient bushing having a first end and a second end, and having a longitudinal axis extending therebetween
      a longitudinal bore defined in the bushing, said bore having a first end adjacent the first end of the bushing and a second end disposed a distance inwardly from the second end of the bushing; wherein the first end of the bore is of a first width measured in a first direction orthogonal to the longitudinal axis and is of a second width measured in a second direction orthogonal to both the longitudinal axis and to the first direction, and the first width is greater than the second width; and wherein the second end of the bore has a width that is substantially equal to the second width when measured in both of the first and second directions; and
   a plurality of rods, each rod having a first end that is received within the bore of one of the resilient bushings and a second end remote therefrom, and the second end of the rod is adapted to contact the support surface.

3. The stand as defined in claim 2, wherein each frame member has an upper surface and a lower surface and a portion of each projection extends vertically upward for a distance beyond the upper surfaces of the adjacent frame members, and a portion of each projection extends vertically downward for a distance beyond the lower surfaces of the adjacent frame members.

4. The stand as defined in claim 3, wherein each projection has an upper surface spaced a distance vertically above the upper surfaces of the adjacent frame members, and a lower surface spaced a distance vertically beneath the lower surfaces of the adjacent frame members, and an aperture is defined in each projection extending between the upper and lower surfaces of the projection; and wherein each of the resilient bushings is received in one of the apertures in one of the projections.

5. The stand as defined in claim 4, wherein the first end of each bushing is disposed a distance vertically below the lower surface of the associated projection, and the second end of the bushing is disposed a distance vertically above the upper surface of associated projection and the second end of the bushing is adapted to receive a portion of a lower end of the article thereon.

6. The stand as defined in claim 2, wherein each rod has a cross-sectional shape orthogonal that is non-complementary to the first end of the bore and is complementary to the second end of the bore.

7. The stand as defined in claim 2, wherein the first end of the bore is substantially oval in cross-sectional shape and the second end of the bore is substantially circular in shape.

8. The stand as defined in claim 7, wherein the rod has a width and the width is substantially equal to the second width of the first end of the bore.

9. The stand as defined in claim 1, further comprising a plurality of protective members, each protective member being engaged with the second end of one of the rods.

10. The stand as defined in claim 9, wherein the protective members are selected from the group consisting of caps, feet, friction-increasing pads, friction-reducing pads, and spikes.

11. The stand as defined in claim 1, wherein each rod has a length as measured between the first and second ends thereof; and the length is between one half inch and two inches.

12. The stand as defined in claim 2, wherein the support frame is a unitary component with the frame members and projections being integrally formed by molding.

13. The stand as defined in claim 2, wherein the frame members are elongate and tubular.

14. The stand as defined in claim 3, wherein the projections have an arcuate exterior surface.

15. In combination:
   a substantially horizontal support surface;
   a stand comprising:
      a support frame;
      a plurality of isolating assemblies provided on the support frame, each isolating assembly comprising:
         a resilient bushing having a first end and a second end, and having a longitudinal axis extending therebetween
         a longitudinal bore defined in the bushing, said bore having a first end adjacent the first end of the bushing and a second end disposed a distance inwardly from the second end of the bushing; wherein the first end of the bore is elliptical in shape in a first horizontal plane disposed at right angles to the longitudinal axis and the second end of the bore is circular in shape in a second horizontal plane disposed at right angles to the longitudinal axis and a plurality of rods, each rod having a first end that is received within the bore of one of the resilient bushings and a second end which extends outwardly from the bore and is adapted to contact the support surface, and wherein the rod is circular in cross-sectional shape and is complementary in diameter to the second end of the bore such that an exterior circumferential surface of the rod abuts an interior surface of the bushing which defines the second end of the bore; and a gap is defined between the exterior surface of the rod and a portion of the interior surface of the bushing which defines the first end of the bore.

16. The combination as defined in claim 15, wherein each rod has a length as measured between its first and second ends, and the length is between one half inch and two inches.

17. In combination:
a substantially horizontal support surface;
a stand comprising:
a support frame; comprising three or more frame members which are coplanar and are disposed in end-to-end relation to each other;
three or more projections, wherein each projection is interposed between and connected to the ends of two adjacent frame members; and
wherein the frame members and projections surround and define a central space between them;
a plurality of isolating assemblies provided on the support frame, each isolating assembly comprising:
a resilient bushing having a first end and a second end, and having a longitudinal axis extending therebetween
a longitudinal bore defined in the bushing, said bore having a first end adjacent the first end of the bushing and a second end disposed a distance inwardly from the second end of the bushing; wherein the first end of the bore is of a first width measured in a first direction orthogonal to the longitudinal axis and is of a second width measured in a second direction orthogonal to both the longitudinal axis and to the first direction, and the first width is greater than the second width; and wherein the second end of the bore has a width that is substantially equal to the second width when measured in both of the first and second directions; and
a plurality of rods, each rod having a first end and a second end, where the first end is received within the bore of one of the resilient bushings and the second end abuts the support surface and retains the support frame a spaced distance vertically above the support surface.

18. The combination as defined in claim 17, wherein each projection has an upper surface spaced a distance vertically above the upper surfaces of the adjacent frame members, and a lower surface spaced a distance vertically beneath the lower surfaces of the adjacent frame members, and an aperture is defined in each projection extending between the upper and lower surfaces of the projection; and wherein each of the resilient bushings is received in one of the apertures in one of the projections.

19. The combination as defined in claim 18, further comprising a plurality of protective members, each protective member being engaged with the second end of one of the rods such that the protective member is interposed between the second end and the support surface; and wherein the protective members are selected from the group consisting of caps, feet, friction-increasing pads, friction-reducing pads, and spikes.

20. In combination:
a substantially horizontal support surface;
a stand comprising:
a support frame; comprising three or more frame members which are coplanar and are disposed in end-to-end relation to each other;
three or more projections, wherein each projection is interposed between and connected to the ends of two adjacent frame members; and wherein the frame members and projections surround and define a central space between them;
a plurality of isolating assemblies provided on the support frame, each isolating assembly comprising:
a resilient bushing having a first end and a second end, and having a longitudinal axis extending therebetween
a longitudinal bore defined in the bushing, said bore having a first end adjacent the first end of the bushing and a second end disposed a distance inwardly from the second end of the bushing; wherein the first end of the bore is of a first width measured in a first direction orthogonal to the longitudinal axis and is of a second width measured in a second direction orthogonal to both the longitudinal axis and to the first direction, and the first width is greater than the second width; and wherein the second end of the bore has a width that is substantially equal to the second width when measured in both of the first and second directions; and
a plurality of rods, each rod having a first end and a second end, where the first end is received within the bore of one of the resilient bushings and the second end abuts the support surface and retains the support frame a spaced distance vertically above the support surface.

* * * * *